United States Patent
Cooper (10) Patent No.: US 11,939,994 B2
(45) Date of Patent: *Mar. 26, 2024

(54) ROTOR AND ROTOR SHAFT FOR MOLTEN METAL

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/703,912

(22) Filed: Mar. 24, 2022

(65) Prior Publication Data

US 2022/0213895 A1    Jul. 7, 2022

Related U.S. Application Data

(63) Continuation of application No. 15/916,089, filed on Mar. 8, 2018, now Pat. No. 11,286,939, which is a
(Continued)

(51) Int. Cl.
*F04D 7/06* (2006.01)
*C22B 7/00* (2006.01)
(Continued)

(52) U.S. Cl.
CPC ............... *F04D 7/065* (2013.01); *C22B 7/003* (2013.01); *C22B 9/00* (2013.01); *F04D 29/20* (2013.01);
(Continued)

(58) Field of Classification Search
None
See application file for complete search history.

(56) References Cited

U.S. PATENT DOCUMENTS

| 35,604 A | 6/1862 | Guild |
| 116,797 A | 7/1871 | Barnhart |

(Continued)

FOREIGN PATENT DOCUMENTS

| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.
(Continued)

*Primary Examiner* — Scott R Kastler
(74) *Attorney, Agent, or Firm* — SNELL & WILMER L.L.P.

(57) ABSTRACT

A molten metal rotor receives and retains an end of a molten metal rotor shaft. The rotor shaft has one or more projections at the end received in the rotor. The rotor has an inner cavity, a top surface with an opening leading to the inner cavity, and at least one abutment. The opening includes one or more portions for allowing each projection to pass through the opening and into the inner cavity. The rotor and/or shaft are then rotated so at least one of the outwardly-extending projections is under the top surface of the rotor and is against an abutment. A molten metal pump, rotary degasser scrap melter or other device used in molten metal may utilize a rotor/shaft combination as disclosed herein.

16 Claims, 6 Drawing Sheets

Related U.S. Application Data continuation of application No. 14/791,166, filed on Jul. 2, 2015, now Pat. No. 10,138,892.

(60) Provisional application No. 62/020,332, filed on Jul. 2, 2014.

(51) Int. Cl.

| | | |
|---|---|---|
| *C22B 9/00* | (2006.01) | |
| *F04D 29/20* | (2006.01) | |
| *F16C 3/02* | (2006.01) | |
| *F16D 1/02* | (2006.01) | |
| *F16D 1/10* | (2006.01) | |
| *F27D 3/14* | (2006.01) | |
| *F27D 3/16* | (2006.01) | |
| *F27D 17/00* | (2006.01) | |
| *F27D 27/00* | (2010.01) | |
| *F27D 99/00* | (2010.01) | |

(52) U.S. Cl.
CPC ............... *F16D 1/02* (2013.01); *F16D 1/10* (2013.01); *F27D 3/14* (2013.01); *F27D 3/16* (2013.01); *F27D 17/002* (2013.01); *F27D 27/005* (2013.01); *F27D 99/00* (2013.01); *F16C 3/02* (2013.01); *F16D 2001/102* (2013.01); *F27D 2099/0083* (2013.01); *Y02P 10/20* (2015.11)

(56) References Cited

U.S. PATENT DOCUMENTS

| | | |
|---|---|---|
| 209,219 A | 10/1878 | Bookwalter |
| 251,104 A | 12/1881 | Finch |
| 307,845 A | 11/1884 | Curtis |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'Donnell |
| 909,774 A | 1/1909 | Flora |
| 919,194 A | 4/1909 | Livingston |
| 1,037,659 A | 9/1912 | Rembert |
| 1,100,475 A | 6/1914 | Franckaerts |
| 1,170,512 A | 2/1916 | Chapman |
| 1,196,758 A | 9/1916 | Blair |
| 1,304,068 A | 5/1919 | Krogh |
| 1,331,997 A | 2/1920 | Neal |
| 1,185,314 A | 3/1920 | London |
| 1,377,101 A | 5/1921 | Sparling |
| 1,380,798 A | 6/1921 | Hansen et al. |
| 1,439,365 A | 12/1922 | Hazell |
| 1,454,967 A | 5/1923 | Gill |
| 1,470,607 A | 10/1923 | Hazell |
| 1,513,875 A | 11/1924 | Wilke |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,697,202 A | 1/1929 | Nagle |
| 1,717,969 A | 6/1929 | Goodner |
| 1,718,396 A | 6/1929 | Wheeler |
| 1,896,201 A | 2/1933 | Sterner-Rainer |
| 1,988,875 A | 1/1935 | Saborio |
| 2,013,455 A | 9/1935 | Baxter |
| 2,035,282 A | 3/1936 | Schmeller, Sr. |
| 2,038,221 A | 4/1936 | Kagi |
| 2,075,633 A | 3/1937 | Anderegg |
| 2,090,162 A | 8/1937 | Tighe |
| 2,091,677 A | 8/1937 | Fredericks |
| 2,138,814 A | 12/1938 | Bressler |
| 2,173,377 A | 9/1939 | Schultz, Jr. et al. |
| 2,264,740 A | 12/1941 | Brown |
| 2,280,979 A | 4/1942 | Rocke |
| 2,290,961 A | 7/1942 | Heuer |
| 2,300,688 A | 11/1942 | Nagle |
| 2,304,849 A | 12/1942 | Ruthman |
| 2,368,962 A | 2/1945 | Blom |
| 2,383,424 A | 8/1945 | Stepanoff |
| 2,423,655 A | 7/1947 | Mars et al. |
| 2,488,447 A | 11/1949 | Tangen et al. |
| 2,493,467 A | 1/1950 | Sunnen |
| 2,515,097 A | 7/1950 | Schryber |
| 2,515,478 A | 7/1950 | Tooley et al. |
| 2,528,208 A | 10/1950 | Bonsack et al. |
| 2,528,210 A | 10/1950 | Stewart |
| 2,543,633 A | 2/1951 | Lamphere |
| 2,566,892 A | 4/1951 | Jacobs |
| 2,625,720 A | 1/1953 | Ross |
| 2,626,086 A | 1/1953 | Forrest |
| 2,676,279 A | 4/1954 | Wilson |
| 2,677,609 A | 4/1954 | Moore et al. |
| 2,698,583 A | 1/1955 | House et al. |
| 2,714,354 A | 8/1955 | Farrand |
| 2,762,095 A | 9/1956 | Pemetzrieder |
| 2,768,587 A | 10/1956 | Corneil |
| 2,775,348 A | 12/1956 | Williams |
| 2,779,574 A | 1/1957 | Schneider |
| 2,787,873 A | 4/1957 | Hadley |
| 2,808,782 A | 10/1957 | Thompson et al. |
| 2,809,107 A | 10/1957 | Russell |
| 2,821,472 A | 1/1958 | Peterson et al. |
| 2,824,520 A | 2/1958 | Bartels |
| 2,832,292 A | 4/1958 | Edwards |
| 2,839,006 A | 6/1958 | Mayo |
| 2,853,019 A | 9/1958 | Thornton |
| 2,865,295 A | 12/1958 | Nikolaus |
| 2,865,618 A | 12/1958 | Abell |
| 2,868,132 A | 1/1959 | Rittershofer |
| 2,901,006 A | 8/1959 | Andrews |
| 2,901,677 A | 8/1959 | Chessman et al. |
| 2,906,632 A | 9/1959 | Nickerson |
| 2,918,876 A | 12/1959 | Howe |
| 2,948,524 A | 8/1960 | Sweeney et al. |
| 2,958,293 A | 11/1960 | Pray, Jr. |
| 2,966,345 A | 12/1960 | Burgoon et al. |
| 2,966,381 A | 12/1960 | Menzel |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,015,190 A | 1/1962 | Arbeit |
| 3,039,864 A | 6/1962 | Hess |
| 3,044,408 A | 7/1962 | Mellott |
| 3,048,384 A | 8/1962 | Sweeney et al. |
| 3,070,393 A | 12/1962 | Silverberg et al. |
| 3,092,030 A | 6/1963 | Wunder |
| 3,099,870 A | 8/1963 | Seeler |
| 3,128,327 A | 4/1964 | Upton |
| 3,130,678 A | 4/1964 | Chenault |
| 3,130,679 A | 4/1964 | Sence |
| 3,151,565 A | 10/1964 | Albertson et al. |
| 3,171,357 A | 3/1965 | Egger |
| 3,172,850 A | 3/1965 | Englesberg et al. |
| 3,203,182 A | 8/1965 | Pohl |
| 3,227,547 A | 1/1966 | Szekely |
| 3,244,109 A | 4/1966 | Barske |
| 3,251,676 A | 5/1966 | Johnson |
| 3,255,702 A | 6/1966 | Gehrm |
| 3,258,283 A | 6/1966 | Winberg et al. |
| 3,272,619 A | 9/1966 | Sweeney et al. |
| 3,289,473 A | 12/1966 | Louda |
| 3,291,473 A | 12/1966 | Sweeney et al. |
| 3,368,805 A | 2/1968 | Davey et al. |
| 3,374,943 A | 3/1968 | Cervenka |
| 3,400,923 A | 9/1968 | Howie et al. |
| 3,417,929 A | 12/1968 | Secrest et al. |

(56) References Cited

U.S. PATENT DOCUMENTS

| | | |
|---|---|---|
| 3,432,336 A | 3/1969 | Langrod et al. |
| 3,459,133 A | 8/1969 | Scheffler |
| 3,459,346 A | 8/1969 | Tinnes |
| 3,477,383 A | 11/1969 | Rawson et al. |
| 3,487,805 A | 1/1970 | Satterthwaite |
| 3,512,762 A | 5/1970 | Umbricht |
| 3,512,788 A | 5/1970 | Kilbane |
| 3,532,445 A | 10/1970 | Scheffler et al. |
| 3,561,885 A | 2/1971 | Lake |
| 3,575,525 A | 4/1971 | Fox et al. |
| 3,581,767 A | 6/1971 | Jackson |
| 3,612,715 A | 10/1971 | Yedidiah |
| 3,618,917 A | 11/1971 | Fredrikson et al. |
| 3,620,716 A | 11/1971 | Hess |
| 3,650,730 A | 3/1972 | Derham et al. |
| 3,689,048 A | 9/1972 | Foulard et al. |
| 3,715,112 A | 2/1973 | Carbonnel |
| 3,732,032 A | 5/1973 | Daneel |
| 3,737,304 A | 6/1973 | Blayden et al. |
| 3,737,305 A | 6/1973 | Blayden et al. |
| 3,743,263 A | 7/1973 | Szekely |
| 3,743,500 A | 7/1973 | Foulard et al. |
| 3,753,690 A | 8/1973 | Emley et al. |
| 3,759,628 A | 9/1973 | Kempf |
| 3,759,635 A | 9/1973 | Carter et al. |
| 3,767,382 A | 10/1973 | Bruno et al. |
| 3,776,660 A | 12/1973 | Anderson et al. |
| 3,785,632 A | 1/1974 | Kraemer et al. |
| 3,787,143 A | 1/1974 | Carbonnel et al. |
| 3,799,522 A | 3/1974 | Brant et al. |
| 3,799,523 A | 3/1974 | Seki |
| 3,807,708 A | 4/1974 | Jones |
| 3,814,400 A | 6/1974 | Seki |
| 3,824,028 A | 7/1974 | Zenkner et al. |
| 3,824,042 A | 7/1974 | Barnes et al. |
| 3,836,280 A | 9/1974 | Koch |
| 3,839,019 A | 10/1974 | Bruno et al. |
| 3,844,972 A | 10/1974 | Tully, Jr. et al. |
| 3,871,872 A | 3/1975 | Downing et al. |
| 3,873,073 A | 3/1975 | Baum et al. |
| 3,873,305 A | 3/1975 | Claxton et al. |
| 3,881,039 A | 4/1975 | Baldieri et al. |
| 3,886,992 A | 6/1975 | Maas et al. |
| 3,915,594 A | 10/1975 | Nesseth |
| 3,915,694 A | 10/1975 | Ando |
| 3,935,003 A | 1/1976 | Steinke et al. |
| 3,941,588 A | 3/1976 | Dremann |
| 3,941,589 A | 3/1976 | Norman et al. |
| 3,942,473 A | 3/1976 | Chodash |
| 3,954,134 A | 5/1976 | Maas et al. |
| 3,958,979 A | 5/1976 | Valdo |
| 3,958,981 A | 5/1976 | Forberg et al. |
| 3,961,778 A | 6/1976 | Carbonnel et al. |
| 3,966,456 A | 6/1976 | Ellenbaum et al. |
| 3,967,286 A | 6/1976 | Andersson et al. |
| 3,972,709 A | 8/1976 | Chin et al. |
| 3,973,871 A | 8/1976 | Hance |
| 3,984,234 A | 10/1976 | Claxton et al. |
| 3,985,000 A | 10/1976 | Hartz |
| 3,997,336 A | 12/1976 | van Linden et al. |
| 4,003,560 A | 1/1977 | Carbonnel |
| 4,008,884 A | 2/1977 | Fitzpatrick et al. |
| 4,018,598 A | 4/1977 | Markus |
| 4,043,146 A | 8/1977 | Stegherr et al. |
| 4,052,199 A | 10/1977 | Mangalick |
| 4,055,390 A | 10/1977 | Young |
| 4,063,849 A | 12/1977 | Modianos |
| 4,068,965 A | 1/1978 | Lichti |
| 4,073,606 A | 2/1978 | Eller |
| 4,091,970 A | 5/1978 | Komiyama et al. |
| 4,119,141 A | 10/1978 | Thut et al. |
| 4,125,146 A | 11/1978 | Muller |
| 4,126,360 A | 11/1978 | Miller et al. |
| 4,128,415 A | 12/1978 | van Linden et al. |
| 4,147,474 A | 4/1979 | Heimdal et al. |
| 4,169,584 A | 10/1979 | Mangalick |
| 4,191,486 A | 3/1980 | Pelton |
| 4,213,742 A | 7/1980 | Henshaw |
| 4,242,039 A | 12/1980 | Villard et al. |
| 4,244,423 A | 1/1981 | Thut et al. |
| 4,286,985 A | 9/1981 | van Linden et al. |
| 4,305,214 A | 12/1981 | Hurst |
| 4,322,245 A | 3/1982 | Claxton |
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,356,940 A | 11/1982 | Ansorge |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,470,846 A | 9/1984 | Dube |
| 4,474,315 A | 10/1984 | Gilbert et al. |
| 4,496,393 A | 1/1985 | Lustenberger |
| 4,504,392 A | 3/1985 | Groteke |
| 4,509,979 A | 4/1985 | Bauer |
| 4,530,641 A | 7/1985 | Gschwender |
| 4,537,624 A | 8/1985 | Tenhover et al. |
| 4,537,625 A | 8/1985 | Tenhover et al. |
| 4,545,887 A | 10/1985 | Amesen |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,594,052 A | 6/1986 | Niskanen |
| 4,596,510 A | 6/1986 | Arneth et al. |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,655,610 A | 4/1987 | Al-Jaroudi |
| 4,668,166 A | 5/1987 | Lutz |
| 4,669,953 A | 6/1987 | Gschwender |
| 4,673,434 A | 6/1987 | Withers et al. |
| 4,682,585 A | 7/1987 | Hiltebrandt |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areaux et al. |
| 4,714,371 A | 12/1987 | Cuse |
| 4,717,540 A | 1/1988 | McRae et al. |
| 4,739,974 A | 4/1988 | Mordue |
| 4,741,664 A | 5/1988 | Olmstead |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,822,473 A | 4/1989 | Arnesen |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,854,834 A | 8/1989 | Gschwender et al. |
| 4,859,413 A | 8/1989 | Harris et al. |
| 4,860,819 A | 8/1989 | Moscoe et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |

(56) References Cited

U.S. PATENT DOCUMENTS

| | | |
|---|---|---|
| 4,909,704 A | 3/1990 | Lutz |
| 4,911,726 A | 3/1990 | Warkentin |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,967,827 A | 11/1990 | Campbell |
| 4,973,433 A | 11/1990 | Gilbert et al. |
| 4,986,736 A | 1/1991 | Kajiwara et al. |
| 4,989,736 A | 2/1991 | Andersson et al. |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-on et al. |
| 5,058,654 A | 10/1991 | Simmons |
| 5,078,572 A | 1/1992 | Amra et al. |
| 5,080,715 A | 1/1992 | Provencher et al. |
| 5,083,753 A | 1/1992 | Soofi |
| 5,088,893 A | 2/1992 | Gilbert et al. |
| 5,092,821 A | 3/1992 | Gilbert et al. |
| 5,098,134 A | 3/1992 | Monckton |
| 5,099,554 A | 3/1992 | Cooper |
| 5,114,312 A | 5/1992 | Stanislao |
| 5,126,047 A | 6/1992 | Martin et al. |
| 5,131,632 A | 7/1992 | Olson |
| 5,135,202 A | 8/1992 | Yamashita et al. |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 11/1992 | Shoji et al. |
| 5,165,858 A | 11/1992 | Gilbert et al. |
| 5,177,304 A | 1/1993 | Nagel |
| 5,191,154 A | 3/1993 | Nagel |
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,303,903 A | 4/1994 | Butler et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,383,651 A | 1/1995 | Blasen et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,494,382 A | 2/1996 | Kloppers |
| 5,495,746 A | 3/1996 | Sigworth |
| 5,505,143 A | 4/1996 | Nagel |
| 5,505,435 A | 4/1996 | Laszlo |
| 5,509,791 A | 4/1996 | Turner |
| 5,511,766 A | 4/1996 | Vassilicos |
| 5,520,422 A | 5/1996 | Friedrich |
| 5,537,940 A | 7/1996 | Nagel et al. |
| 5,543,558 A | 8/1996 | Nagel et al. |
| 5,555,822 A | 9/1996 | Loewen et al. |
| 5,558,501 A | 9/1996 | Wang et al. |
| 5,558,505 A | 9/1996 | Mordue et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,660,614 A | 8/1997 | Waite et al. |
| 5,662,725 A | 9/1997 | Cooper |
| 5,676,520 A | 10/1997 | Thut |
| 5,678,244 A | 10/1997 | Shaw et al. |
| 5,678,807 A | 10/1997 | Cooper |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |
| 5,717,149 A | 2/1998 | Nagel et al. |
| 5,718,416 A | 2/1998 | Flisakowski et al. |
| 5,735,668 A | 4/1998 | Klein |
| 5,735,935 A | 4/1998 | Areaux |
| 5,741,422 A | 4/1998 | Eichenmiller et al. |
| 5,744,093 A | 4/1998 | Davis |
| 5,744,117 A | 4/1998 | Wilkinson et al. |
| 5,745,861 A | 4/1998 | Bell et al. |
| 5,755,847 A | 5/1998 | Quayle |
| 5,758,712 A | 6/1998 | Pederson |
| 5,772,324 A | 6/1998 | Falk |
| 5,776,420 A | 7/1998 | Nagel |
| 5,785,494 A | 7/1998 | Vild et al. |
| 5,842,832 A | 12/1998 | Thut |
| 5,846,481 A * | 12/1998 | Tilak .................. C22B 9/05 |
| | | 266/216 |
| 5,858,059 A | 1/1999 | Abramovich et al. |
| 5,863,314 A | 1/1999 | Morando |
| 5,866,095 A | 2/1999 | McGeever et al. |
| 5,875,385 A | 2/1999 | Stephenson et al. |
| 5,935,528 A | 8/1999 | Stephenson et al. |
| 5,944,496 A | 8/1999 | Cooper |
| 5,947,705 A | 9/1999 | Mordue et al. |
| 5,948,352 A | 9/1999 | Jagt et al. |
| 5,951,243 A | 9/1999 | Cooper |
| 5,961,285 A | 10/1999 | Meneice et al. |
| 5,963,580 A | 10/1999 | Eckert |
| 5,992,230 A | 11/1999 | Scarpa et al. |
| 5,993,726 A | 11/1999 | Huang |
| 5,993,728 A | 11/1999 | Vild |
| 6,007,313 A | 12/1999 | Siegel |
| 6,019,576 A | 2/2000 | Thut |
| 6,027,685 A | 2/2000 | Cooper |
| 6,036,745 A | 3/2000 | Gilbert et al. |
| 6,074,455 A | 6/2000 | van Linden et al. |
| 6,082,965 A | 7/2000 | Morando |
| 6,093,000 A | 7/2000 | Cooper |
| 6,096,109 A | 8/2000 | Nagel et al. |
| 6,113,154 A | 9/2000 | Thut |
| 6,123,523 A | 9/2000 | Cooper |
| 6,152,691 A | 11/2000 | Thut |
| 6,168,753 B1 | 1/2001 | Morando |
| 6,187,096 B1 | 2/2001 | Thut |

(56) References Cited

U.S. PATENT DOCUMENTS

| | | |
|---|---|---|
| 6,199,836 B1 | 3/2001 | Rexford et al. |
| 6,217,823 B1 | 4/2001 | Vild et al. |
| 6,231,639 B1 | 5/2001 | Eichenmiller |
| 6,250,881 B1 | 6/2001 | Mordue et al. |
| 6,254,340 B1 | 7/2001 | Vild et al. |
| 6,270,717 B1 | 8/2001 | Tremblay et al. |
| 6,280,157 B1 | 8/2001 | Cooper |
| 6,293,759 B1 | 9/2001 | Thut |
| 6,303,074 B1 | 10/2001 | Cooper |
| 6,345,964 B1 | 2/2002 | Cooper |
| 6,354,796 B1 | 3/2002 | Morando |
| 6,358,467 B1 | 3/2002 | Mordue |
| 6,364,930 B1 | 4/2002 | Kos |
| 6,371,723 B1 | 4/2002 | Grant et al. |
| 6,398,525 B1 | 6/2002 | Cooper |
| 6,439,860 B1 | 8/2002 | Greer |
| 6,451,247 B1 | 9/2002 | Mordue et al. |
| 6,457,940 B1 | 10/2002 | Lehman |
| 6,457,950 B1 | 10/2002 | Cooper et al. |
| 6,464,458 B2 | 10/2002 | Vild et al. |
| 6,474,962 B1 | 11/2002 | Allen et al. |
| 6,495,948 B1 | 12/2002 | Garrett, III |
| 6,497,559 B1 | 12/2002 | Grant |
| 6,500,228 B1 | 12/2002 | Klingensmith et al. |
| 6,503,292 B2 | 1/2003 | Klingensmith et al. |
| 6,524,066 B2 | 2/2003 | Thut |
| 6,533,535 B2 | 3/2003 | Thut |
| 6,551,060 B2 | 4/2003 | Mordue et al. |
| 6,562,286 B1 | 5/2003 | Lehman |
| 6,656,415 B2 | 12/2003 | Kos |
| 6,679,936 B2 | 1/2004 | Quackenbush |
| 6,689,310 B1 | 2/2004 | Cooper |
| 6,709,234 B2 | 3/2004 | Gilbert et al. |
| 6,716,147 B1 | 4/2004 | Hinkle et al. |
| 6,723,276 B1 | 4/2004 | Cooper |
| 6,805,834 B2 | 10/2004 | Thut |
| 6,843,640 B2 | 1/2005 | Mordue et al. |
| 6,848,497 B2 | 2/2005 | Sale et al. |
| 6,869,271 B2 | 3/2005 | Gilbert et al. |
| 6,869,564 B2 | 3/2005 | Gilbert et al. |
| 6,881,030 B2 | 4/2005 | Thut |
| 6,887,424 B2 | 5/2005 | Ohno et al. |
| 6,887,425 B2 | 5/2005 | Mordue et al. |
| 6,902,696 B2 | 6/2005 | Klingensmith et al. |
| 7,037,462 B2 | 5/2006 | Klingensmith et al. |
| 7,074,361 B2 | 7/2006 | Carolla et al. |
| 7,083,758 B2 | 8/2006 | Tremblay |
| 7,131,482 B2 | 11/2006 | Vincent et al. |
| 7,157,043 B2 | 1/2007 | Neff |
| 7,204,954 B2 | 4/2007 | Mizuno |
| 7,273,582 B2 | 9/2007 | Mordue |
| 7,279,128 B2 | 10/2007 | Kennedy et al. |
| 7,326,028 B2 | 2/2008 | Morando |
| 7,402,276 B2 | 7/2008 | Cooper |
| 7,470,392 B2 * | 12/2008 | Cooper ............... F04D 7/065 266/239 |
| 7,476,357 B2 | 1/2009 | Thut |
| 7,481,966 B2 | 1/2009 | Mizuno |
| 7,497,988 B2 | 3/2009 | Thut |
| 7,507,365 B2 | 3/2009 | Thut |
| 7,507,367 B2 | 3/2009 | Cooper |
| 7,543,605 B1 | 6/2009 | Morando |
| 7,731,891 B2 | 6/2010 | Cooper |
| 7,771,171 B2 | 8/2010 | Mohr |
| 7,841,379 B1 | 11/2010 | Evans |
| 7,896,617 B1 | 3/2011 | Morando |
| 7,906,068 B2 | 3/2011 | Cooper |
| 8,075,837 B2 | 12/2011 | Cooper |
| 8,110,141 B2 | 2/2012 | Cooper |
| 8,137,023 B2 | 3/2012 | Greer |
| 8,142,145 B2 | 3/2012 | Thut |
| 8,178,037 B2 | 5/2012 | Cooper |
| 8,328,540 B2 | 12/2012 | Wang |
| 8,333,921 B2 | 12/2012 | Thut |
| 8,337,746 B2 | 12/2012 | Cooper |
| 8,361,379 B2 | 1/2013 | Cooper |
| 8,366,993 B2 | 2/2013 | Cooper |
| 8,409,495 B2 | 4/2013 | Cooper |
| 8,440,135 B2 | 5/2013 | Cooper |
| 8,444,911 B2 | 5/2013 | Cooper |
| 8,449,814 B2 | 5/2013 | Cooper |
| 8,475,594 B2 | 7/2013 | Bright et al. |
| 8,475,708 B2 | 7/2013 | Cooper |
| 8,480,950 B2 | 7/2013 | Jetten et al. |
| 8,501,084 B2 | 8/2013 | Cooper |
| 8,524,146 B2 | 9/2013 | Cooper |
| 8,529,828 B2 | 9/2013 | Cooper |
| 8,535,603 B2 | 9/2013 | Cooper |
| 8,580,218 B2 | 11/2013 | Turenne et al. |
| 8,613,884 B2 | 12/2013 | Cooper |
| 8,714,914 B2 | 5/2014 | Cooper |
| 8,753,563 B2 | 6/2014 | Cooper |
| 8,840,359 B2 | 9/2014 | Vick et al. |
| 8,899,932 B2 | 12/2014 | Tetkoskie et al. |
| 8,915,830 B2 | 12/2014 | March et al. |
| 8,920,680 B2 | 12/2014 | Mao |
| 9,011,761 B2 | 4/2015 | Cooper |
| 9,017,597 B2 | 4/2015 | Cooper |
| 9,034,244 B2 | 5/2015 | Cooper |
| 9,057,376 B2 | 6/2015 | Thut |
| 9,057,377 B1 | 6/2015 | Thut |
| 9,074,601 B1 | 7/2015 | Thut |
| 9,080,577 B2 | 7/2015 | Cooper |
| 9,108,224 B2 | 8/2015 | Schererz et al. |
| 9,108,244 B2 | 8/2015 | Cooper |
| 9,156,087 B2 | 10/2015 | Cooper |
| 9,193,532 B2 | 11/2015 | March et al. |
| 9,205,490 B2 | 12/2015 | Cooper |
| 9,234,520 B2 | 1/2016 | Morando |
| 9,273,376 B2 | 3/2016 | Lutes et al. |
| 9,328,615 B2 | 5/2016 | Cooper |
| 9,377,028 B2 | 6/2016 | Cooper |
| 9,382,599 B2 | 7/2016 | Cooper |
| 9,383,140 B2 | 7/2016 | Cooper |
| 9,388,925 B2 | 7/2016 | Juarez |
| 9,409,232 B2 | 8/2016 | Cooper |
| 9,410,744 B2 | 8/2016 | Cooper |
| 9,422,942 B2 | 8/2016 | Cooper |
| 9,435,343 B2 | 9/2016 | Cooper |
| 9,464,636 B2 | 10/2016 | Cooper |
| 9,470,239 B2 | 10/2016 | Cooper |
| 9,476,644 B2 | 10/2016 | Howitt et al. |
| 9,481,035 B2 | 11/2016 | Cooper |
| 9,481,918 B2 | 11/2016 | Vild et al. |
| 9,482,469 B2 | 11/2016 | Cooper |
| 9,494,366 B1 | 11/2016 | Thut |
| 9,506,129 B2 | 11/2016 | Cooper |
| 9,506,346 B2 | 11/2016 | Bright et al. |
| 9,532,670 B2 | 1/2017 | Vaessen et al. |
| 9,566,645 B2 | 2/2017 | Cooper |
| 9,581,388 B2 | 2/2017 | Cooper |
| 9,587,883 B2 | 3/2017 | Cooper |
| 9,632,670 B2 | 4/2017 | Wu et al. |
| 9,657,578 B2 | 5/2017 | Cooper |
| 9,855,600 B2 | 1/2018 | Cooper |
| 9,862,026 B2 | 1/2018 | Cooper |
| 9,903,383 B2 | 2/2018 | Cooper |
| 9,909,808 B2 | 3/2018 | Cooper |
| 9,920,767 B2 | 3/2018 | Klain et al. |
| 9,925,587 B2 | 3/2018 | Cooper |
| 9,951,777 B2 | 4/2018 | Morando et al. |
| 9,970,442 B2 | 5/2018 | Tipton |
| 9,982,945 B2 | 5/2018 | Cooper |
| 10,052,688 B2 | 8/2018 | Cooper |
| 10,072,897 B2 | 9/2018 | Cooper |
| 10,126,058 B2 | 11/2018 | Cooper |
| 10,126,059 B2 | 11/2018 | Cooper |
| 10,138,892 B2 * | 11/2018 | Cooper ............... F16D 1/10 |
| 10,195,664 B2 | 2/2019 | Cooper et al. |
| 10,267,314 B2 | 4/2019 | Cooper |
| 10,274,256 B2 | 4/2019 | Cooper |
| 10,302,361 B2 | 5/2019 | Cooper |
| 10,307,821 B2 | 6/2019 | Cooper |
| 10,309,725 B2 | 6/2019 | Cooper |

(56) References Cited

U.S. PATENT DOCUMENTS

| | | |
|---|---|---|
| 10,322,451 B2 | 6/2019 | Cooper |
| 10,345,045 B2 | 7/2019 | Cooper |
| 10,352,620 B2 | 7/2019 | Cooper |
| 10,428,821 B2 | 10/2019 | Cooper |
| 10,458,708 B2 | 10/2019 | Cooper |
| 10,465,688 B2 | 11/2019 | Cooper |
| 10,562,097 B2 | 2/2020 | Cooper |
| 10,570,745 B2 | 2/2020 | Cooper |
| 10,641,270 B2 | 5/2020 | Cooper |
| 10,641,279 B2 | 5/2020 | Cooper |
| 10,675,679 B2 | 6/2020 | Cooper |
| 11,020,798 B2 | 6/2021 | Cooper |
| 11,098,719 B2 | 8/2021 | Cooper |
| 11,098,720 B2 | 8/2021 | Cooper |
| 11,103,920 B2 | 8/2021 | Cooper |
| 11,130,173 B2 | 9/2021 | Cooper |
| 11,149,747 B2 | 10/2021 | Cooper |
| 11,167,345 B2 | 11/2021 | Cooper |
| 11,185,916 B2 | 11/2021 | Cooper |
| 11,286,939 B2 * | 3/2022 | Cooper ............... F27D 17/002 |
| 11,358,216 B2 | 6/2022 | Cooper |
| 11,358,217 B2 | 6/2022 | Cooper |
| 11,391,293 B2 | 7/2022 | Cooper |
| 11,471,938 B2 | 10/2022 | Fontana et al. |
| 11,519,414 B2 | 12/2022 | Cooper |
| 2001/0000465 A1 | 4/2001 | Thut |
| 2002/0089099 A1 | 7/2002 | Denning |
| 2002/0146313 A1 | 10/2002 | Thut |
| 2002/0185790 A1 | 12/2002 | Klingensmith et al. |
| 2002/0185794 A1 | 12/2002 | Vincent |
| 2003/0047850 A1 | 3/2003 | Areaux |
| 2003/0075844 A1 | 4/2003 | Mordue et al. |
| 2003/0082052 A1 | 5/2003 | Gilbert et al. |
| 2003/0151176 A1 | 8/2003 | Ohno |
| 2003/0201583 A1 | 10/2003 | Klingensmith |
| 2004/0050525 A1 | 3/2004 | Kennedy et al. |
| 2004/0076533 A1 | 4/2004 | Cooper |
| 2004/0096330 A1 | 5/2004 | Gilbert et al. |
| 2004/0115079 A1 | 6/2004 | Cooper |
| 2004/0245684 A1 | 12/2004 | Kojo et al. |
| 2004/0262825 A1 | 12/2004 | Cooper |
| 2005/0013713 A1 | 1/2005 | Cooper |
| 2005/0013714 A1 | 1/2005 | Cooper |
| 2005/0013715 A1 | 1/2005 | Cooper |
| 2005/0053499 A1 | 3/2005 | Cooper |
| 2005/0077730 A1 | 4/2005 | Thut |
| 2005/0081607 A1 | 4/2005 | Patel et al. |
| 2005/0116398 A1 | 6/2005 | Tremblay |
| 2006/0180963 A1 | 8/2006 | Thut |
| 2006/0198725 A1 | 9/2006 | Thut |
| 2007/0253807 A1 | 11/2007 | Cooper |
| 2008/0163999 A1 | 7/2008 | Hymas et al. |
| 2008/0202644 A1 | 8/2008 | Grassi |
| 2008/0211147 A1 | 9/2008 | Cooper |
| 2008/0213111 A1 | 9/2008 | Cooper |
| 2008/0230966 A1 | 9/2008 | Cooper |
| 2008/0253905 A1 | 10/2008 | Morando et al. |
| 2008/0304970 A1 | 12/2008 | Cooper |
| 2008/0314548 A1 | 12/2008 | Cooper |
| 2009/0054167 A1 | 2/2009 | Cooper |
| 2009/0269191 A1 | 10/2009 | Cooper |
| 2010/0104415 A1 | 4/2010 | Morando |
| 2010/0200354 A1 | 8/2010 | Yagi et al. |
| 2011/0133374 A1 | 6/2011 | Cooper |
| 2011/0140318 A1 | 6/2011 | Reeves et al. |
| 2011/0140319 A1 | 6/2011 | Cooper |
| 2011/0140619 A1 | 6/2011 | Lin et al. |
| 2011/0142603 A1 | 6/2011 | Cooper |
| 2011/0142606 A1 | 6/2011 | Cooper |
| 2011/0148012 A1 | 6/2011 | Cooper |
| 2011/0163486 A1 | 7/2011 | Cooper |
| 2011/0210232 A1 | 9/2011 | Cooper |
| 2011/0220771 A1 | 9/2011 | Cooper |
| 2011/0227338 A1 | 9/2011 | Pollack |
| 2011/0303706 A1 | 12/2011 | Cooper |
| 2012/0003099 A1 | 1/2012 | Tetkoskie |
| 2012/0163959 A1 | 6/2012 | Morando |
| 2013/0105102 A1 | 5/2013 | Cooper |
| 2013/0142625 A1 | 6/2013 | Cooper |
| 2013/0214014 A1 | 8/2013 | Cooper |
| 2013/0224038 A1 | 8/2013 | Tetkoskie et al. |
| 2013/0292426 A1 | 11/2013 | Cooper |
| 2013/0292427 A1 | 11/2013 | Cooper |
| 2013/0299524 A1 | 11/2013 | Cooper |
| 2013/0299525 A1 | 11/2013 | Cooper |
| 2013/0306687 A1 | 11/2013 | Cooper |
| 2013/0334744 A1 | 12/2013 | Tremblay et al. |
| 2013/0343904 A1 | 12/2013 | Cooper |
| 2014/0008849 A1 | 1/2014 | Cooper |
| 2014/0041252 A1 | 2/2014 | Vild et al. |
| 2014/0044520 A1 | 2/2014 | Tipton |
| 2014/0083253 A1 | 3/2014 | Lutes et al. |
| 2014/0210144 A1 | 7/2014 | Torres et al. |
| 2014/0232048 A1 | 8/2014 | Howitt et al. |
| 2014/0252697 A1 | 9/2014 | Rauch |
| 2014/0252701 A1 | 9/2014 | Cooper |
| 2014/0261800 A1 | 9/2014 | Cooper |
| 2014/0263482 A1 | 9/2014 | Cooper |
| 2014/0265068 A1 | 9/2014 | Cooper |
| 2014/0271209 A1 | 9/2014 | Cooper |
| 2014/0363309 A1 | 12/2014 | Henderson et al. |
| 2015/0069679 A1 | 3/2015 | Henderson et al. |
| 2015/0184311 A1 | 7/2015 | Turenne |
| 2015/0192364 A1 | 7/2015 | Cooper |
| 2015/0217369 A1 | 8/2015 | Cooper |
| 2015/0219111 A1 | 8/2015 | Cooper |
| 2015/0219112 A1 | 8/2015 | Cooper |
| 2015/0219113 A1 | 8/2015 | Cooper |
| 2015/0219114 A1 | 8/2015 | Cooper |
| 2015/0224574 A1 | 8/2015 | Cooper |
| 2015/0252807 A1 | 9/2015 | Cooper |
| 2015/0285557 A1 | 10/2015 | Cooper |
| 2015/0285558 A1 | 10/2015 | Cooper |
| 2015/0323256 A1 | 11/2015 | Cooper |
| 2015/0328682 A1 | 11/2015 | Cooper |
| 2015/0328683 A1 | 11/2015 | Cooper |
| 2016/0031007 A1 | 2/2016 | Cooper |
| 2016/0040265 A1 | 2/2016 | Cooper |
| 2016/0047602 A1 | 2/2016 | Cooper |
| 2016/0053762 A1 | 2/2016 | Cooper |
| 2016/0053814 A1 | 2/2016 | Cooper |
| 2016/0082507 A1 | 3/2016 | Cooper |
| 2016/0089718 A1 | 3/2016 | Cooper |
| 2016/0091251 A1 | 3/2016 | Cooper |
| 2016/0116216 A1 | 4/2016 | Schlicht et al. |
| 2016/0221855 A1 | 8/2016 | Retorick et al. |
| 2016/0250686 A1 | 9/2016 | Cooper |
| 2016/0265535 A1 | 9/2016 | Cooper |
| 2016/0305711 A1 | 10/2016 | Cooper |
| 2016/0320129 A1 | 11/2016 | Cooper |
| 2016/0320130 A1 | 11/2016 | Cooper |
| 2016/0320131 A1 | 11/2016 | Cooper |
| 2016/0346836 A1 | 12/2016 | Henderson et al. |
| 2016/0348973 A1 | 12/2016 | Cooper |
| 2016/0348974 A1 | 12/2016 | Cooper |
| 2016/0348975 A1 | 12/2016 | Cooper |
| 2017/0037852 A1 | 2/2017 | Bright et al. |
| 2017/0038146 A1 | 2/2017 | Cooper |
| 2017/0045298 A1 | 2/2017 | Cooper |
| 2017/0056973 A1 | 3/2017 | Tremblay et al. |
| 2017/0082368 A1 | 3/2017 | Cooper |
| 2017/0106435 A1 | 4/2017 | Vincent |
| 2017/0106441 A1 | 4/2017 | Vincent |
| 2017/0130298 A1 | 5/2017 | Teranishi et al. |
| 2017/0167793 A1 | 6/2017 | Cooper et al. |
| 2017/0198721 A1 | 7/2017 | Cooper |
| 2017/0219289 A1 | 8/2017 | Williams et al. |
| 2017/0241713 A1 | 8/2017 | Henderson et al. |
| 2017/0246681 A1 | 8/2017 | Tipton et al. |
| 2017/0276430 A1 | 9/2017 | Cooper |
| 2018/0058465 A1 | 3/2018 | Cooper |
| 2018/0111189 A1 | 4/2018 | Cooper |
| 2018/0178281 A1 | 6/2018 | Cooper |
| 2018/0195513 A1 | 7/2018 | Cooper |

(56) References Cited

U.S. PATENT DOCUMENTS

| | | |
|---|---|---|
| 2018/0311726 A1 | 11/2018 | Cooper |
| 2019/0032675 A1 | 1/2019 | Cooper |
| 2019/0270134 A1 | 9/2019 | Cooper |
| 2019/0293089 A1 | 9/2019 | Cooper |
| 2019/0351481 A1 | 11/2019 | Tetkoskie |
| 2019/0360491 A1 | 11/2019 | Cooper |
| 2019/0360492 A1 | 11/2019 | Cooper |
| 2019/0368494 A1 | 12/2019 | Cooper |
| 2020/0130050 A1 | 4/2020 | Cooper |
| 2020/0130051 A1 | 4/2020 | Cooper |
| 2020/0130052 A1 | 4/2020 | Cooper |
| 2020/0130053 A1 | 4/2020 | Cooper |
| 2020/0130054 A1 | 4/2020 | Cooper |
| 2020/0182247 A1 | 6/2020 | Cooper |
| 2020/0182248 A1 | 6/2020 | Cooper |
| 2020/0256350 A1 | 8/2020 | Cooper |
| 2020/0360987 A1 | 11/2020 | Cooper |
| 2020/0360988 A1 | 11/2020 | Cooper |
| 2020/0360989 A1 | 11/2020 | Cooper |
| 2020/0360990 A1 | 11/2020 | Cooper |
| 2020/0362865 A1 | 11/2020 | Cooper |
| 2020/0363128 A1 | 11/2020 | Cooper |
| 2021/0199115 A1 | 7/2021 | Cooper |
| 2021/0254622 A1 | 8/2021 | Cooper |
| 2022/0025905 A1 | 1/2022 | Cooper |
| 2022/0080498 A1 | 3/2022 | Cooper |
| 2022/0193764 A1 | 6/2022 | Cooper |
| 2022/0234099 A1 | 7/2022 | Cooper |
| 2022/0381246 A1 | 12/2022 | Cooper |
| 2023/0001474 A1 | 1/2023 | Cooper |
| 2023/0219132 A1 | 7/2023 | Cooper |

FOREIGN PATENT DOCUMENTS

| | | |
|---|---|---|
| CA | 2244251 | 6/1998 |
| CA | 2305865 | 2/2000 |
| CA | 2176475 | 7/2005 |
| CA | 2924572 | 4/2015 |
| CH | 392268 | 9/1965 |
| CN | 102943761 | 2/2013 |
| CN | 103511331 A | 1/2014 |
| DE | 1800446 | 12/1969 |
| DE | 19541093 | 5/1997 |
| DE | 19614350 | 10/1997 |
| DE | 102006051814 | 7/2008 |
| EP | 168250 | 1/1986 |
| EP | 665378 | 8/1995 |
| EP | 1019635 | 6/2006 |
| GB | 543607 | 3/1942 |
| GB | 942648 | 11/1963 |
| GB | 1185314 | 3/1970 |
| GB | 1565911 A | 4/1980 |
| GB | 1575991 | 10/1980 |
| GB | 2122260 | 11/1984 |
| GB | 2193257 | 2/1988 |
| GB | 2217784 | 3/1989 |
| GB | 2289919 | 12/1995 |
| JP | 58048796 | 3/1983 |
| JP | 63104773 | 5/1988 |
| JP | 11-270799 | 10/1999 |
| JP | 5112837 | 1/2013 |
| MX | 227385 | 4/2005 |
| NO | 90756 | 1/1959 |
| SU | 416401 | 2/1974 |
| SU | 773312 | 10/1980 |
| WO | 199808990 | 3/1998 |
| WO | 199825031 | 6/1998 |
| WO | 200009889 | 2/2000 |
| WO | 2002012147 | 2/2002 |
| WO | 2004029307 | 4/2004 |
| WO | 2010147932 | 12/2010 |
| WO | 2014031484 A2 | 2/2014 |
| WO | 2014055082 | 4/2014 |
| WO | 2014150503 | 9/2014 |
| WO | 2014185971 | 11/2014 |

OTHER PUBLICATIONS

Document No. 504217: Excerpts from "Pyrotek Inc.'s Motion for Summary Judgment of Invalidity and Unenforceability of U.S. Pat. No. 7,402,276," Oct. 2, 2009.

Document No. 505026: Excerpts from "MMEI's Response to Pyrotek's Motion for Summary Judgment of Invalidity or Enforceability of U.S. Pat. No. 7,402,276," Oct. 9, 2009.

Document No. 507689: Excerpts from "MMEI's Pre-Hearing Brief and Supplemental Motion for Summary Judgment of Infringement of Claims 3, 4, 15, 17-20, 26, 28 and 29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Notice of Reissue Examination Certificate dated Aug. 27, 2001 in U.S. Appl. No. 90/005,910.

\* cited by examiner

SECTION A-A

ROTOR AND ROTOR SHAFT FOR MOLTEN METAL

CROSS REFERENCE TO RELATED APPLICATION

This application is a continuation of and claims priority to U.S. patent application Ser. No. 15/916,089 entitled Rotor and Rotor Shaft for Molten Metal, filed Mar. 8, 2018 know U.S. Pat. No. 11,286,939), which is a continuation of and claims priority to U.S. patent application Ser. No. 14/791,166 entitled Rotor and Rotor Shaft for Molten Metal, filed Jul. 2, 2015 (now U.S. Pat. No. 10,138,892, which is a non-provisional of and claims priority to U.S. Provisional Application Ser. No. 62/020,332 entitled "Coupling and Rotor Shaft for Molten Metal Devices, filed on Jul. 2, 2014, the contents of each of the aforementioned applications are incorporated herein in their entirety for all purposes.

FIELD OF THE INVENTION

The inventions herein relate to devices used in molten metal environments and include (1) a rotor, and (2) a rotor shaft to be connected to the rotor.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, freon, and helium, that are released into molten metal.

Known molten-metal pumps include a pump base (also called a housing or casing), one or more inlets (an inlet being an opening in the housing to allow molten metal to enter a pump chamber), a pump chamber, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive system is typically an impeller shaft connected to one end of a drive shaft, the other end of the drive shaft being connected to a motor. Often, the impeller shaft is comprised of graphite, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,123,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent Application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of the charging well where scrap metal is charged (i.e., added).

Transfer pumps are generally used to transfer molten metal from the one structure to another structure such as a ladle or another furnace.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Numerous rotor shaft to motor shaft couplings are known. A problem with the couplings, however, is that by applying driving force to the rotor shaft the rotor shaft tends to break at the location where the force is being applied. This is typically at the location where the coupling and rotor shaft are in contact, and the broken end of the rotor shaft must often be chiseled out of an opening in the coupling in which it is retained.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the connector of the impeller.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump may be used in conjunction with the scrap melter to circulate the molten metal in order to maintain a relatively constant temperature within the molten metal.

Rotors are used in molten metal processing for a variety of purposes, such as in a pumping device to circulate molten metal, in a rotary degasser to circulate molten metal and mix gas therewith, and in scrap melters to help create a downward draw to pull scrap into the molten metal where the scrap is melted. The most common type of connection between a rotor shaft and a rotor is to: (1) thread an end of the rotor shaft, (2) bore a threaded opening into the rotor, and (3) then screw the threaded end of the rotor shaft into the threaded opening of the rotor. Problems with this type of connection are that the threads can fail over time, thereby causing the rotor to move erratically and fail, and it is difficult to reverse the threaded end of the shaft to remove the rotor. Thus, if the rotor or rotor shaft fail, often both components must be replaced.

SUMMARY OF THE INVENTION

The present invention alleviates these problems by providing a rotor that includes a section for connecting to a rotor shaft. The connecting section of the rotor has a cavity, an upper surface, and an opening in the upper surface, the opening leading to the cavity. The opening has at least one elongated section. The rotor shaft has an outer surface and a second end with at least one projection extending therefrom, the second end configured to fit through the opening in the upper surface of the rotor (with the at least one projection passing through the at least one elongated section). Once the second end of the rotor shaft is received in the cavity of the rotor, the rotor and/or rotor shaft are rotated so the at least one projection is retained in a position under the top surface and next to an abutment. As the rotor shaft turns the projection presses against the abutment to transmit driving force to the rotor.

In one preferred embodiment the rotor shaft has three or four projections, the opening in the upper surface has the same number of elongated sections that respectively align with each of the projections. The second end of the rotor shaft passes through the opening and into the cavity and is then rotated so each projection is positioned against a respective abutment and under the upper surface of the rotor.

DETAILED DESCRIPTION OF A PREFERRED EMBODIMENT

Figure 1:
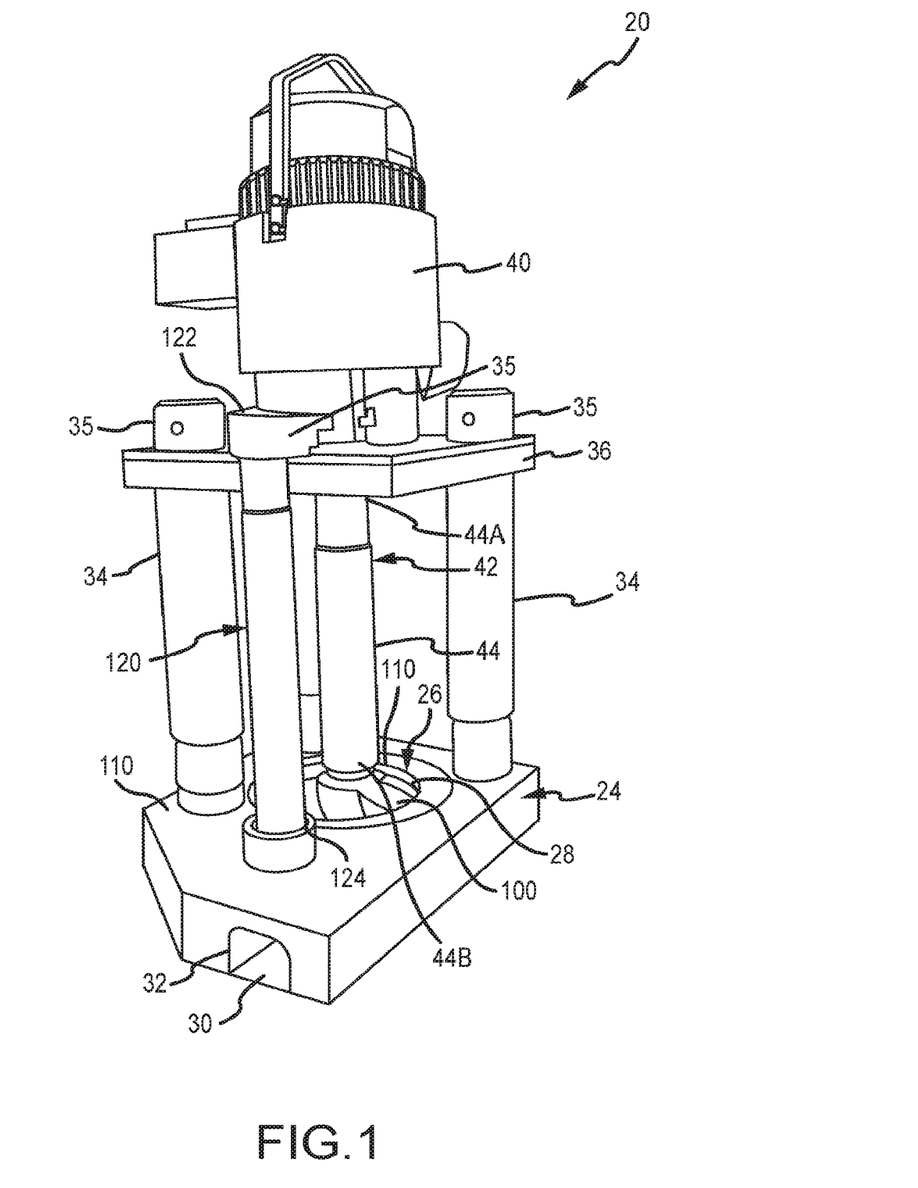
FIG. 1 is a perspective view of a pump for pumping molten metal, which includes a rotor and rotor shaft according to aspects of the invention.

Referring now to the drawing where the purpose is to illustrate and describe embodiments of the invention, and not to limit same, FIG. 1 shows a molten metal pump 20 that includes a rotor shaft 44 and rotor 100 in accordance with aspects of the present invention. During use, pump 20 is usually positioned in a molten metal bath B in a pump well, which may be part of the open well of a reverbatory furnace.

Figure 2:
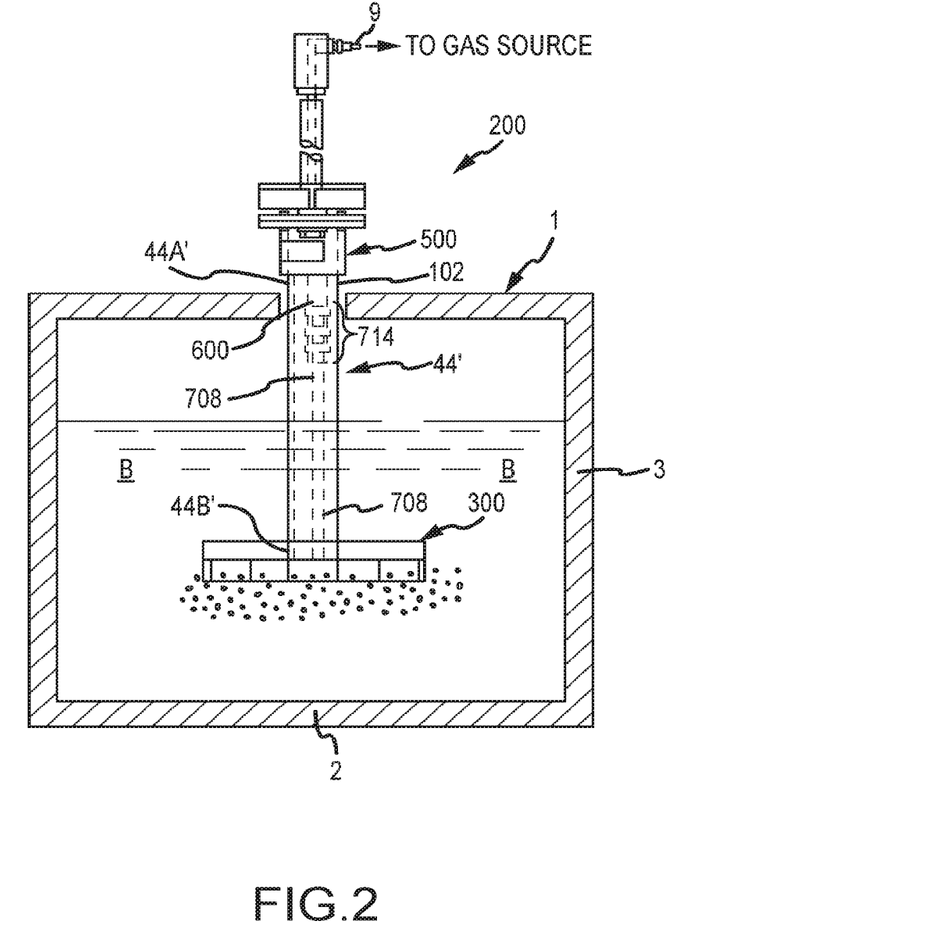
FIG. 2 is a perspective view of a rotary degasser that may include a rotor shaft and rotor according to aspects of the invention.
Figure 3:
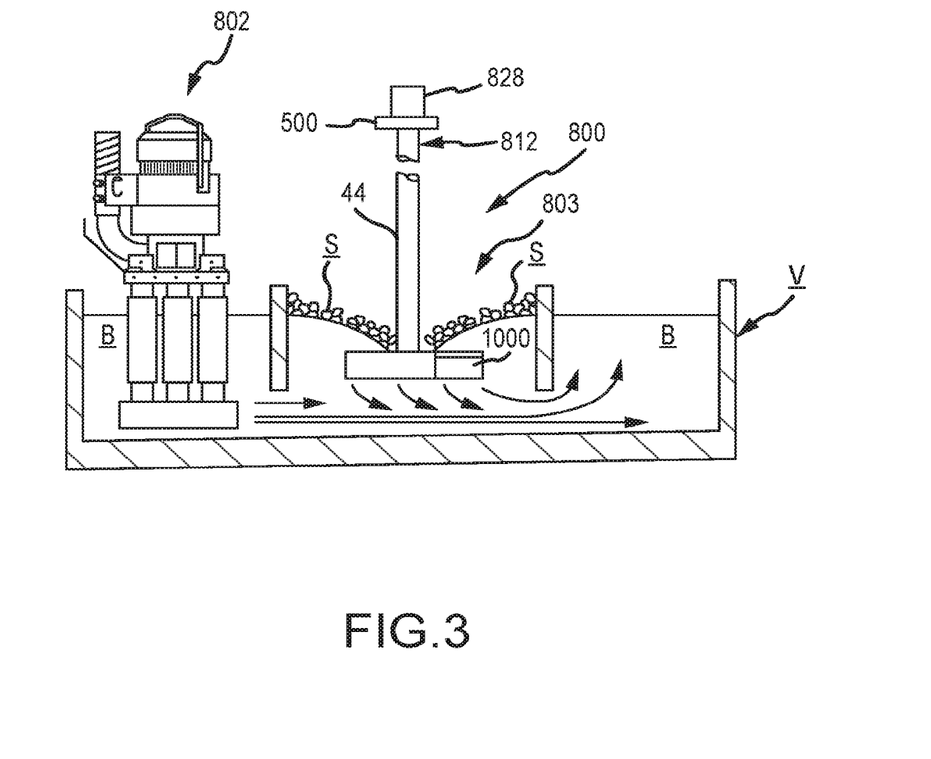
FIG. 3 is a perspective view of a scrap melter that may include a rotor shaft and rotor according to aspects of the invention.

FIG. 2 shows an example of a rotary degasser that could potentially use a rotor shaft/rotor connection in accordance with aspects of the invention and FIG. 3 shows an example of a scrap melter that could potentially use a rotor shaft/rotor connection in accordance with aspects of the invention. Rotor shaft 44' of rotary degasser 200 is in all respects the same as rotor shaft 44 described below with respect to the way in which it couples to rotor 300.

The components of pump 20, including rotor 100, that are exposed to the molten metal are preferably formed of structural refractory materials, which are resistant to degradation in the molten metal. Carbonaceous refractory materials, such as carbon of a dense or structural type, including graphite, graphitized carbon, clay-bonded graphite, carbon-bonded graphite, or the like have all been found to be most suitable because of cost and ease of machining. Such components may be made by mixing ground graphite with a fine clay binder, forming the non-coated component and baking, and may be glazed or unglazed. In addition, components made of carbonaceous refractory materials may be treated with one or more chemicals to make the components more resistant to oxidation. Oxidation and erosion treatments for graphite parts are practiced commercially, and graphite so treated can be obtained from sources known to those skilled in the art.

Pump 20 can be any structure or device for pumping or otherwise conveying molten metal, such as the pump disclosed in U.S. Pat. No. 5,203,681 to Cooper, or an axial pump having an axial, rather than tangential, discharge. One preferred pump 20 has a pump base 24 for being submersed in a molten metal bath. In this embodiment, pump base 24 preferably includes a generally nonvolute pump chamber 26, such as a cylindrical pump chamber or what has been called a "cut" volute, although pump base 24 may have any shape pump chamber suitable of being used, including a volute-shaped chamber. Chamber 26 may have only one opening, either in its top or bottom, since only one opening is required to introduce molten metal into pump chamber 26, although chamber 26 may have an opening in both its top and bottom. Generally, pump chamber 24 has two coaxial openings of the same diameter and usually one is blocked by a flow blocking plate mounted on the bottom of, or formed as part of, rotor 100. Base 24 further includes a tangential discharge 30 (although another type of discharge, such as an axial discharge may be used) in fluid communication with chamber 26.

The invention is not limited to any particular type or configuration of base, or of even having a base. A pump used with the invention could be of any size, design or configuration suitable for utilizing a rotor shaft and rotor according to the invention.

In the preferred embodiment, post clamps 35 secure posts 34 to superstructure 36. In the embodiment shown, one or more support posts 34 connect base 24 to a superstructure 36 of pump 20 thus supporting superstructure 36, although any structure or structures capable of supporting superstructure 36 may be used. Additionally, pump 20 could be constructed so there is no physical connection between the base and the superstructure, wherein the superstructure is independently supported. The motor, drive shaft and rotor could be suspended without a superstructure, wherein they are supported, directly or indirectly, to a structure independent of a pump base.

A motor 40, which can be any structure, system or device suitable for powering pump 20, but is preferably an electric or pneumatic motor, as shown is positioned on superstructure 36 and is connected to an end of a drive shaft 42. Drive shaft 42 can be any structure suitable for rotating a rotor (also called an impeller), and preferably comprises a motor shaft (not shown) coupled to rotor shaft 44. The motor shaft has a first end and a second end, wherein the first end of the motor shaft connects to motor 40 and the second end of the motor shaft connects to a coupling.

Figure 4:
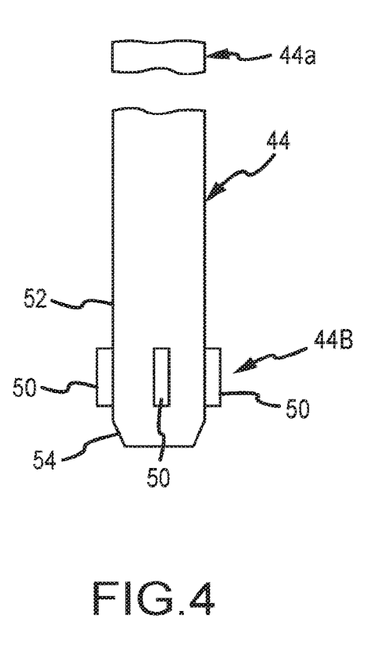
FIG. 4 is a side view of a rotor shaft according to aspects of the invention.
Figure 5:
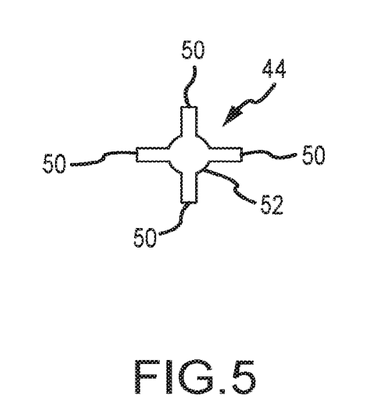
FIG. 5 is a view of the rotor shaft of FIG. 4.
Figure 6:
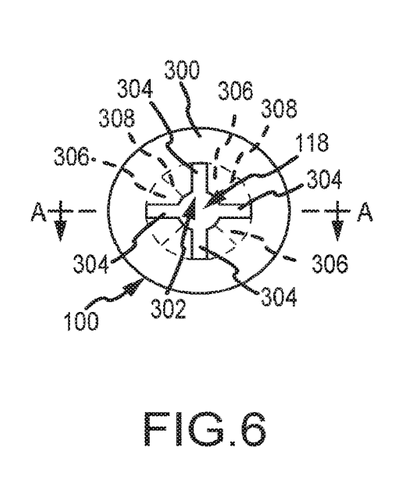
FIG. 6 is a top view of a rotor according to aspects of the invention.
Figure 7:
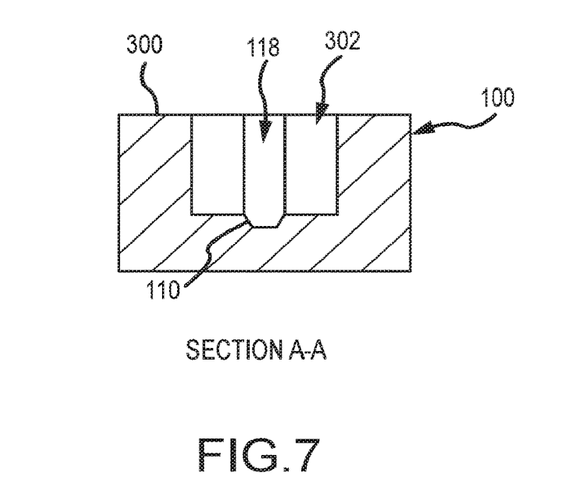
FIG. 7 is a side, cross-sectional view of the rotor of FIG. 6 taken along lines A-A.
Figure 8:
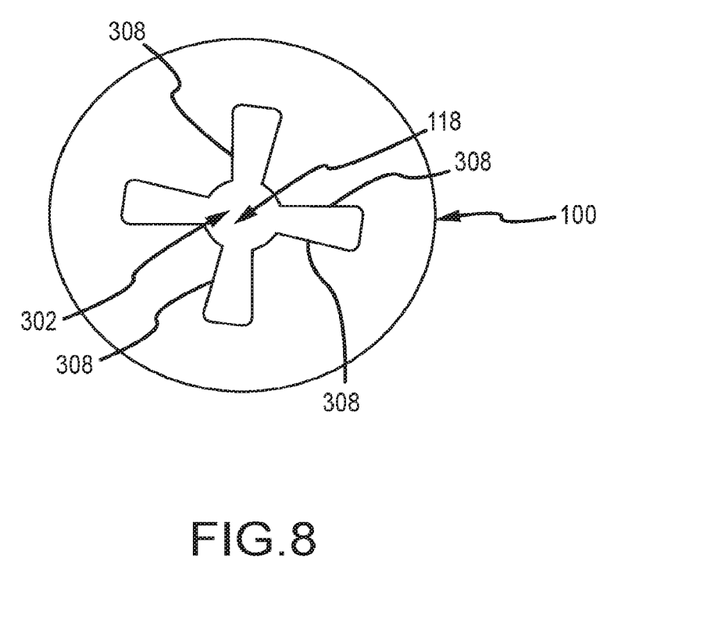
FIG. 8 is a top view of the rotor of FIG. 6 with the top surface removed.
Figure 9:
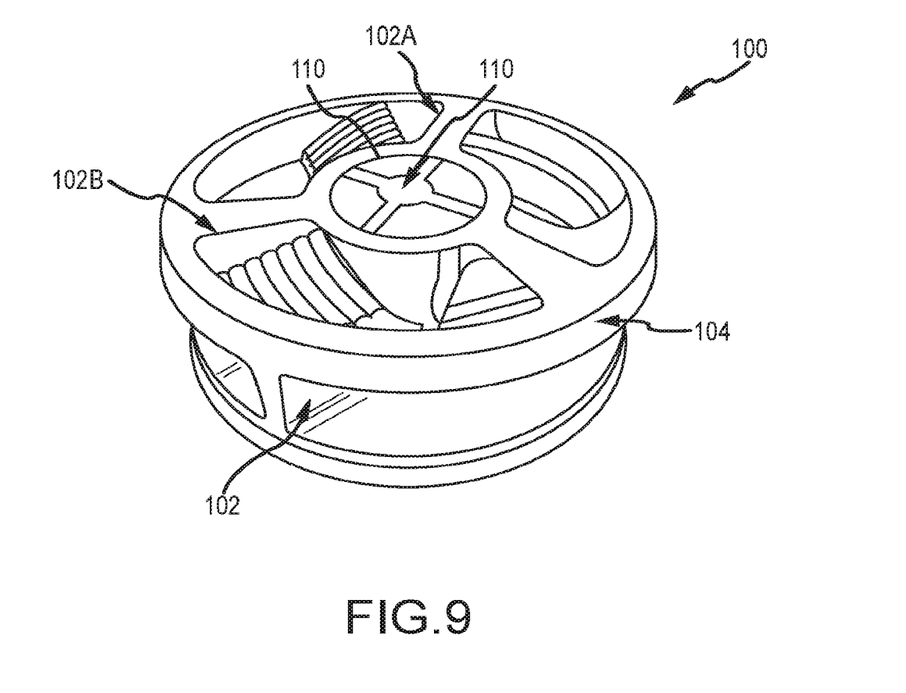
FIG. 9 is a side, perspective view of a rotor according to aspects of the invention.

Rotor shaft 44 is shown in FIGS. 1, 4 and 5 and has a first end 44A that connects to the coupling and a second end 44B that connects to rotor 100, best seen in FIGS. 6-9. End 44A can connect to a coupling in any suitable manner.

End 44B of rotor shaft 44 has at least one outwardly-extending projection 50, and as shown has four outwardly-extending projections 50 equally radially spaced about the outer surface 52 (which as shown is cylindrical or annular) of rotor shaft 44, although any suitable number of projections may be used. Each projection 50 can be of any suitable size or shape, and at any suitable location on end 44B of rotor shaft 44. In one embodiment each projection 50 is generally rectangular, between ⅜" and 1½" wide, between ¾" and 3" in length (as measured along the longitudinal axis of rotor shaft 44) and extends outward from rotor shaft 44 by ¼" to 2½". Each projection 50 can be integrally formed with or attached to rotor shaft 44. For example, a slot (not shown) may be formed in rotor shaft 44 and a projection 50 could be cemented or otherwise affixed into the slot. Each slot (if used) is preferably about 1/32" to ¼" wider and longer than the width and length of the projection 50 that fits therein, and each slot and could be between 3/16" to 1" deep in rotor shaft 44. Second end 44B also may include a chamfered portion 54 that assists in positioning the second end 44B into a connective portion 110 in rotor 100. If rotor shaft 44 is used in a rotary degasser, it would preferably have an internal passage (not shown) for the transfer of gas from first end 44A to second end 44B.

One preferred rotor 100, shown in FIGS. 6-9, could be of any shape or size suitable to be used in a molten metal pump, a rotary degasser or scrap melter, respectively, with the present invention being directed to the connection between the rotor shaft and the rotor and the respective structures of the rotor shaft end 44B and rotor connective portion. Rotor 100 is preferably circular in plain view (although it can be of any suitable shape for its intended use) and includes a displacement structure 102, an inlet structure 104, a top surface 106, a bottom surface 108, and a connective portion 110. Rotor 100 could be comprised of a single material, such as graphite or ceramic, or could be comprised of different materials. For example, inlet structure 104 may be comprised of ceramic and the displacement structure 102 may be comprised of graphite, or vice versa. Any part or all of rotor 100 may also include a protective ceramic coating.

Connective portion 110 connects to end 44B of rotor shaft 44. Connective portion 110 preferably includes (1) an upper surface 300, (2) an opening 302 in upper surface 300, the opening 302 as shown in this embodiment being generally circular and having at least one elongated section 304, and as shown, four elongated sections 304, (3) a cavity 306 beneath upper surface 300 and in communication with each elongated portion 304, and (4) at least one abutment 308 within each cavity 306.

The at least one abutment 308 is adjacent to the at least one elongated section 304 and on the rotational downstream side of elongated section 304. In this manner, when shaft 44 is rotated during operation, rotational driving force is transmitted to rotor 100 by the at least one projection 50 pushing against and transmitting force to the at least one abutment 308. Further, the rotation of shaft 44 during operation would not move a projection 50 back into alignment with a corresponding elongated portion 304, which could lead to the rotor 100 and shaft second end 44B separating.

To connect the rotor shaft 44 to rotor 100, end 44B of rotor shaft 44 is moved through opening 302. The rotor shaft 44 and/or rotor 100 are rotated until at least one projection 50 is under upper surface 300 and pressed against an abutment 308. In this manner the rotor shaft 44 is connected to rotor 100 and can provide rotational driving force thereto.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product.

What is claimed is:

1. A device comprising (A) a rotor shaft, wherein the rotor shaft is comprised of one or more of the group consisting of graphite and ceramic and the rotor shaft includes (a) a first end configured to be received in a coupling, and (b) a second end configured to be connected to a rotor, wherein the second end has at least one outwardly-extending projection that is configured to (i) fit through an elongated section in an upper surface of the rotor, and (ii) be received and retained in a rotor cavity that has at least one abutment, wherein the abutment is configured such that the at least outwardly extending projection presses against the abutment it and transmits driving force to the abutment in order to rotate the rotor when the rotor shaft is rotated; and (B) a rotor connected to the second end of the rotor shaft, the rotor including the upper surface, a rotor opening, the elongated section, the at least one abutment, and the rotor cavity.

2. The device of claim 1 wherein the second end has a plurality of outwardly-extending projections.

3. The device of claim 2, wherein the plurality of outwardly-extending projections are spaced equidistant from one another.

4. The device of claim 2 that has four outwardly-extending projections.

5. The device of claim 1, wherein the at least one outwardly-extending projection comprises ceramic.

6. The device of claim 1, wherein the upper surface of the rotor has four elongated sections and the rotor cavity has four abutments.

7. The device of claim 1, wherein the upper surface of the rotor has four elongated sections.

8. The device of claim 1, wherein the rotor cavity has a diameter and the rotor opening has a width, and the width of the rotor opening is less than the diameter of the rotor cavity.

9. The device of claim 1, wherein the rotor opening has a first width that does not include the at elongated section and a second width that includes the elongated section, wherein the first width is less than the second width.

10. The device of claim 9, wherein the rotor cavity has a diameter and the first width and second width are each less than the diameter.

11. The device of claim 1, wherein the upper surface of the rotor comprises ceramic.

12. The device of claim 1, wherein the rotor opening includes a plurality of elongated sections.

13. The device of claim 1, wherein the rotor has four abutments and the upper surface of the rotor includes four elongated sections.

14. The device of claim 1, wherein the rotor cavity has a diameter and the rotor opening has a width, wherein the width of the rotor opening is less than the diameter of the rotor cavity.

15. The device of claim 1, wherein the rotor opening has a first width that does not include the at least one elongated section and a second width that includes the at least one elongated section, and wherein the first width is less than the second width.

16. The device of claim 15, wherein the rotor cavity has a diameter and the first width and second width are each less than the diameter.

* * * * *